United States Patent [19]

Eckner

[11] 4,319,610

[45] Mar. 16, 1982

[54] PROCESS FOR COATING METAL TUBES AND USE OF THE COATED TUBES

[75] Inventor: Günter Eckner, Hofheim am Taunus, Fed. Rep. of Germany

[73] Assignee: Hoechst Aktiengesellschaft, Frankfurt am Main, Fed. Rep. of Germany

[21] Appl. No.: 193,800

[22] Filed: Oct. 3, 1980

[30] Foreign Application Priority Data

Oct. 5, 1979 [DE] Fed. Rep. of Germany ....... 2940388

[51] Int. Cl.[3] .............................................. F16L 11/14

[52] U.S. Cl. .................................... 138/131; 138/139; 138/143; 138/145; 138/146; 156/187; 156/195; 156/244.13; 156/322; 427/195; 427/203; 427/409; 138/DIG. 1

[58] Field of Search ............... 427/195, 203, 318, 409; 156/187, 195, 244.13, 322; 138/144, 145, 146, 131, 139, 143, DIG. 1

[56] References Cited

U.S. PATENT DOCUMENTS 3,348,995 10/1967 Baker et al. ........................ 427/195

4,211,595 7/1980 Samour .............................. 427/195

4,213,486 7/1980 Samour et al. ................. 427/195 X

*Primary Examiner*—Shrive P. Beck

*Attorney, Agent, or Firm*—Hammond & Littell, Weissenberger and Muserlian

[57] ABSTRACT

A process for the coating of metal tubes by the application of polyethylene to the preheated tubes, a polyethylene with a melt index of over 1 g/10 minutes being applied first to the pre-heated metal tube and a polyethylene with a low melt index being applied thereupon, the process comprising a first step of applying a polyethylene with a melt index of 1.2 to 70 g/10 minutes (190° C./2.16 kg) to the metal tube which has been pre-heated to a temperature of at least 200° C., a second step in which the coating is cooled to a temperature of about 110° to 170° C. and a third step of applying a self-supporting film of polyethylene with a melt index of 0.1 to 7 g/10 minutes at this temperature so that the total coating has a minimum layer thickness of 1.5 to 4 mm and a coated article coated according to said process.

11 Claims, No Drawings

PROCESS FOR COATING METAL TUBES AND USE OF THE COATED TUBES

The coating of metal tubes with a strip of polyethylene coming directly from an extruder is known. In such a process the metal tube is first preheated to a temperature of about 180° C. The types of polyethylene used in the process generally have melt indices (190° C./2.16 kg) of 0.4 to 0.7 g/10 minutes. A time of about 4 minutes is required to form a layer of polyethylene on the metal of about 3.5 mm thick.

The coating of metal tubes with polyethylene powder is also known and the powder is applied e.g. by sprinkling, flinging or throwing onto the tube which is preheated to 300° to 360° C. The polyethylene types which may be used in this process generally have melt indices (190° C./2.16 kg) of 1.2 to 1.7 g/10 minutes. In this process, the melt index of the polyethylene must be higher than that mentioned for the above-mentioned process, since easier melting is essential. Depending on the tube diameter, the coating time in such powder coating processes is generally about 5 minutes. However, this type of process has the disadvantage that a relatively high preheating temperature, and consequently a high consumption of energy is required to melt the polyethylene, as the melt index should not be too low to ensure sufficient corrosion protection.

A composite metal tube coating has been described which consists of a polyethylene powder layer welded onto a steel tube together with a polyethylene layer which is welded onto the powder coating and which has been wound, for example in the form of a polyethylene film from an extruder, onto the hot sintered-on polyethylene powder layer. When the first polyethylene layer is applied, the steel tube should have been preheated e.g. to 150° C. However, at this temperature it is not possible to produce a smooth coherent layer in a desired requisite minimum layer thickness of 1.5 to 4 mm.

In another known process, a polyethylene layer is applied to a steel tube, after first coating the tube with a layer, about 0.05 mm thick, of an adhesion promoter which is applied at a tube temperature lying approximately 100° C. above the setting point of the adhesion promotor. The layer of polyethylene onto the adhesion promotor is applied at a tube temperature, e.g. at 140° C., lying 20° to 50° C. above the setting point. The adhesion promotor of the first layer can be applied in powder form or by winding a film round the tube. The application of the second layer may be effected by pre-extrusion in the form of a double tubing or of a double winding film. In this process, also, the temperature of 140° C. is not sufficient for the purposes desired according to the present invention, namely for a requisite minimum layer thickness.

The covering of a steel tube surface with a polyethylene having a high melt index, for example 1 to 1.5 g/10 minutes (ASTM-D 12 38-53T) has also been disclosed. A second layer of a polyethylene with a low melt index, for example 0.2 to 0.5 g/10 minutes, is applied to the covering. Both layers are applied in the form of a polyethylene powder. If two layers are applied on top of one another in the form of powder, the surface sometimes leaves much to be desired in respect of its homogeneity and its smoothness.

A process with a smaller consumption of energy and time is therefore desired which would give products with properties as good as those from the known processes.

The present invention provides a process for coating metal tubes by the application of polyethylene to the preheated tubes, a polyethylene with a melt index of over 1 g/10 minutes being applied first to the preheated metal tube and a polyethylene with a low melt index being applied thereupon, said process being characterised in that in a first step a polyethylene with a melt index of 1.2 to 70, advantageously 15 to 70, and preferably 17 to 25 g/10 minutes (190° C./2.16 kg) is first applied to the metal tubes which have been preheated to a temperature of at least 200° C., whereafter in a second step the coating is cooled to a temperature of about 110° to 170° C., advantageously 110 to 150, and preferably to 120° C., and in a third step a self-supporting film of polyethylene having a melt index of 0.1 to 7 g/10 minutes is thereupon applied at this temperature, so that the total coating has a minimum thickness of 1.5 and to 4 mm.

One embodiment of the invention provides that a polyethylene powder with a melt index of about 1.2 to 1.7 g/10 minutes or a tape of polyethylene coming directly from an extruder and having a melt index of not more than 1.7 g/10 minutes (190° C./2.16 kg) is first applied to the metal tube which has been preheated to a temperature of at least 300° C. in the case of powder coating and at most 250° C. in the case of coating with extruded tape, the coating is thereafter cooled in the second step to a temperature of about 110 to 170, preferably 110° to 150° C., and in a third step a self-supporting photo-stabilised light-coloured film of polyethylene with a melt index of 0.4 to 1.1 g/10 minutes is thereupon applied at this temperature.

Examples of photo-stabilisers for the light-coloured polyethylene film are e.g. compounds of the benzotriazole type.

The minimum layer thickness of 1.5 to 4 mm is necessary to ensure sufficient corrosion protection for the metal tube. In many cases the layer thickness may also be more than 4 mm.

The process according to the invention has the advantage that it surprisingly entails a high saving of energy compared with known processes and, nevertheless, a considerably higher working speed with at least equally good product properties. Moreover, a light-coloured coating layer provides good protection of the tubes against strong heating during any lengthy storage in the open air under strong thermal action, for example from solar radiation, or when laid in strongly heated soil strata. The coating from the extruder may be effected very simply and in a time-saving manner without additional expenditure on apparatus. The tape coming from the extruder advantageously has a melt index of at least 0.4 g/10 minutes.

Generally, in powder coating, the polyethylene for the first step has a particle size of 1 to 600 μm, preferably 100 to 400 μm. The self-supporting polyethylene film is applied advantageously in the form of a polyethylene tape for example of polyethylene with a melt index of 0.1 to 1.2 g/10 minutes. The application may be effected by rotating the tube. This affords the advantage that the tape can be wound automatically. The tape width can be varied as desired. It may be conveniently 10 to 1500 mm e.g. at least 20 mm. In general, a tape width up to about 1 m is used. During application it is necessary to ensure that the individual coil layers overlap or that the individual coil layers are simultaneously mutually joined together, in order to achieve satisfactory corrosion protection. The layer thickness of the tapes is usually 100 to 400 μm, preferably 100 to 200 μm. Light-coloured tapes are preferably white. Depending on the required end use, however, another colour may also be chosen, for example the warning colour yellow, and also light orange, light blue, light green or the like. In this way, the light-coloured tapes may also serve to identify the tubes.

The speed of coating may vary over wide limits. It depends on the desired layer thickness and on the tube diameter; the outside tube diameter may be, for example, from 50 to 2000 mm. For coating a length of 12 m of a tube with an outside diameter of 1500 mm and a coating layer thickness of 3.5 mm e.g. about 15 to 45, generally about 30 minutes are required in the process of the invention. For coating a tube 400 mm in diameter with a layer thickness of 1.5 mm (this is the minimum thickness for sufficient corrosion protection), generally about 8 to 20, mostly about 15 minutes are required for a coating 12 m long.

In order to further improve the adhesion of the layer applied in the first step to the tube substrate, it is sometimes appropriate to admix with the polyethylene powder an additional resin in the form of a polymer, e.g. polyvinyl acetate, ethylene-vinyl acetate copolymer, ethylene-acrylic acid and/or acrylate copolymer, optionally with further comonomers, or other polymers, advantageously in a proportion of 5 to 15, preferably 5 to 10% by weight relative to the polyethylene powder. According to another embodiment of the invention it is also possible to apply such polymers to the tube before the polyethylene powder is applied. This coating may be effected according to the conventional coating processes, e.g. by spraying, but preferably by powder coating. The same additional resins may also be present in the polyethylene tape in a proportion of 2 to 5% by weight relative to the polyethylene.

The requirements regarding minimum layer thickness, freedom from pores, resistance to paring, impact strength, indentation resistance, elongation at break, specific sheath resistance and ageing due to heat and light in accordance with the provisions of DIN 30670 are fully satisfied by the coatings made according to the invention.

The tubes coated by the process according to the invention have a variety of uses. Owing to the surface protection which they provide they are suitable, above all, for laid pipes, e.g. in pipelines for conveying petroleum, and also gaseous or other liquid substances or substances of higher viscosity, e.g. natural gas, water, settling sludge, concrete, waste waters, suspensions or the like.

Especially advantageous is the use of the tubes coated according to the invention for laying in warm or hot areas, e.g. in desert regions.

EXAMPLES (1) An iron tube (outside diameter 108 mm, wall thickness 10 mm) is preheated to 220° C. and then coated over 2 minutes with polyethylene powder (melt index 17 to 25) in a layer thickness of 2 mm. After 4 minutes the covering has melted and the tube temperature has dropped to 160° C. Starting at this tube temperature, a polyethylene tape 110 μm thick and 50 mm wide with a melt index of 1.2 is applied at 160° C. in a layer thickness of 110 μm. The tube is then cooled to room temperature either by merely allowing it to stand or by passing a cooling medium through the tube. Immediately after the film has been applied a perfect and smooth fusing of both covering layers takes place. After 30 minutes from the start of the powder coating the tube has cooled to 60° C. by being allowed to stand without additional cooling. (2) An iron tube (outside diameter 90 mm, wall thickness 4.5 mm) is preheated to 250° C. and is then coated over 1½ minutes with polyethylene powder (melt index 17 to 25) in a layer thickness of 2 mm. After 3 minutes the coating has melted smooth and cooled to 150° C. At this tube temperature a polyethylene tape 40 mm wide with a melt index of 1.2 and a layer thickness of 110 μm is applied and the tube is then cooled to room temperature. The tape is applied by being wound round the tube which is rotated about its axis, the coil being moved along the tube. Immediately after the tape has been applied a perfect fusing with the first polyethylene layer takes place. After 12 minutes from the start of the tube coating the tube has cooled to 60° C. by being allowed to stand without additional cooling.

(1C) (Comparison—state of the art—preheating temperature above 300° C.)

The same tube as in Example 1 is used, but with a preheating temperature of 310° C. The tube is coated with a polyethylene powder having a melt index of 1.2 to 1.7 g/10 minutes in a layer thickness of 2 mm. After 10 minutes the coating has melted smooth and has reached a temperature of 180° C. The time of cooling to 60° C. by merely allowing the tube to stand is 50 minutes.

(2C) (Comparison—state of the art—preheating temperature above 300° C.)

The same tube as in Example 2 is used, but with a preheating temperature of 360° C. The tube is coated at this temperature with a polyethylene powder having a melt index of 1.2 to 1.7 over 1½ minutes in a layer thickness of 2 mm. After 4 minutes the covering has melted and simultaneously cooled to 310° C. However, further heating is necessary for melting smooth. The tube is therefore further heated for 1 minute after the expiration of these 4 minutes. The covering is thus smooth after this further minute. The time of cooling to 60° C. from the start of the powder coating and without additional cooling is 42 minutes.

As a comparison between the Examples according to the invention and the comparative Examples according to the state of the art shows, the consumption of energy, that is the preheating temperature and simultaneously also the cooling time, is substantially smaller in the Examples according to the invention than in the comparative Examples.

(3) Work is carried out as in Example 1, but, instead of the polyethylene powder, a powder in the form of a mixture of polyethylene with 10% by weight, relative to the polyethylene, of a vinyl acetate homopolymer is applied. A coating is obtained with properties as good as those according to Example 1 and with a perfect smooth surface.

(4) Work is carried out as in Example 2, but, instead of the polyethylene tape, a tape consisting of a mixture of polyethylene and 3.5% by weight, relative to the polyethylene, of a vinyl acetate homopolymer is used. A smooth and perfect coating is obtained with properties as good as those according to Example 2.

(5) An iron tube (outside diameter 108 mm, wall thickness 10 mm) is preheated to 310° C. and then coated over 2 minutes with polyethylene powder (melt index 1.2 to 1.7 g/10 minutes) in a layer thickness of 2 mm. After 20 minutes the coating had melted and the tube temperature had dropped to 160° C. Starting at this tube temperature a polyethylene tape 200 μm thick and 50 mm wide with a melt index of 0.4 g/10 minutes is applied at 160° C. in a layer thickness of 200 μm. The tube is then cooled to room temperature either by merely allowing it to stand or by passing it through a cooling medium. Immediately after the tape has been applied a perfect and smooth fusing of both coating layers takes place. After 40 minutes from the start of the powder coating the tube has cooled to 60° C. by being allowed to stand without additional cooling.

(6) An iron tube (outside diameter 90 mm, wall thickness 4.5 mm) is preheated to 360° C. and then coated over 1½ minutes with polyethylene powder (melt index 1.2 to 1.7 g/10 minutes) in a layer thickness of 2 mm. After at most 8 minutes, the coating has melted smooth and after 12 minutes cooled to 150° C. At this tube temperature a polyethylene tape 40 mm wide with a melt index of 0.4 g/10 minutes is applied in a layer thickness of 200 μm and the tube is then cooled to room temperature. The tape is applied by being wound round the tube which is rotated about its axis, the coil being moved along the tube. Immediately after the tape has been applied a perfect fusing with the first polyethylene layer takes place. After 30 minutes from the start of the tube coating the tube has cooled to 60° C. by being allowed to stand without additional cooling.

(7) An iron tube (outside diameter 500 mm, wall thickness 6 mm) is preheated to 250° C. and coated with an ethylene-acrylic acid copolymer in powder form as an adhesive primer in a layer thickness of 100 μm. A polyethylene tape coming directly from an extruder and having a melt index of 1.2 g/10 mm and a layer thickness of 250 μm is applied to this still hot tube covered in this way. The winding operation is continued until the desired layer thickness of 4 mm is obtained. The tube is cooled to about 140° C. by merely being allowed to stand. At this temperature a yellow polyethylene tape with a melt index of 0.7 g/10 minutes, a width of 300 mm and a layer thickness of 200 μm is applied. A perfect and smooth amalgamation of the two polyethylene covering layers takes place. After 30 minutes from the start of the extruder coating the tube has cooled to 60° C. by being allowed to stand without additional cooling. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A process for coating preheated metal tubes with polyethylene in at least two steps, wherein a metal tube which has been preheated to a temperature of at least 200° C. and at most 250° C. is coated in a first step with polyethylene having a melt index between 1.2 and 70 g/10 min. (190° C./2.16 kg), the coating is cooled in a second step to a temperature between 110° and 170° C., and subsequently in a third step a self-supporting film of polyethylene having a melt index between 0.1 and 7 g/10 min is applied by winding round the tube at a temperature between 110° and 170° C. so that the total coating has a minimum thickness of 1.5 to 4 mm.

2. A process as claimed in claim 1, wherein a polyethylene having a melt index between 15 and 70 g/10 min (190° C./2.16 kg) is applied in the first step.

3. A process as claimed in claim 1, wherein in the first step a polyethylene powder having a melt index between about 1.2 and 1.7 g/10 min (190° C./2.16 kg) and coming directly from an extruder is applied to the metal tube which has been preheated to a temperature of at least 300° C. in the case of powder-coating and wherein in a third step a self-supporting photo-stabilized light-colored film of polyethylene having a melt index between 0.4 and 1.1 g/10 min is applied as a coating.

4. A process as claimed in claim 1, wherein in the second step the coating is cooled to a temperature between 110° and 150° C.

5. A process as claimed in claim 1, wherein in the third step the polyethylene with the lower melt index between 0.1 and 1.2 g/10 min is applied in the form of a polyethylene tape.

6. A process as claimed in claim 5, wherein the polyethylene tape is applied to a rotating tube.

7. A process as claimed in claim 1, wherein the polyethylene coating is applied in the form of a white polyethylene tape having a thickness between 100 and 200 μm.

8. A process as claimed in claim 1, wherein in a first step the polyethylene is applied in admixture with a vinyl acetate homo- or copolymer, the proportion of which being between 5 and 10% by weight, referred to polyethylene.

9. A coated article in the form of a metal tube having been coated according to the process as claimed in claim 1.

10. A coated article as claimed in claim 9 in the form of a pipeline for the transport of petroleum.

11. A process as claimed in claim 1, wherein in the first step a tape of polyethylene having a melt index of at most 1.7 g/10 min and coming directly from an extruder is applied to the metal tube which has been preheated to a temperature of at most 250° C. and wherein in a third step a self-supporting photo-stabilized light-colored film of polyethylene having a melt index between 0.4 and 1.1 g/10 min is applied as a coating.

* * * * *